United States Patent
Kim et al.

(10) Patent No.: US 9,561,593 B2
(45) Date of Patent: Feb. 7, 2017

(54) WORKING METHOD USING SENSOR AND WORKING SYSTEM FOR PERFORMING SAME

(71) Applicant: Electronics and Telecommunications Research Institute, Daejeon (KR)

(72) Inventors: Kye Kyung Kim, Daegu (KR); Sang Seung Kang, Daejeon (KR); Jae Yeon Lee, Daejeon (KR); Joong Bae Kim, Daejeon (KR); Jae Hong Kim, Daejeon (KR); Jong Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 210 days.

(21) Appl. No.: 13/940,186

(22) Filed: Jul. 11, 2013

(65) Prior Publication Data

US 2014/0100696 A1    Apr. 10, 2014

(30) Foreign Application Priority Data

Oct. 4, 2012   (KR) .................. 10-2012-0109982

(51) Int. Cl.
   *G05B 15/00*    (2006.01)
   *G05B 19/00*    (2006.01)
   *B25J 9/16*     (2006.01)

(52) U.S. Cl.
   CPC .... *B25J 9/1697* (2013.01); *G05B 2219/40053* (2013.01); *G05B 2219/45063* (2013.01)

(58) Field of Classification Search
   CPC ....... B25J 9/1697; B25J 19/021; B25J 9/0084; B25J 9/1682; G05B 2219/40053; G05B 2219/40014; G05B 2219/40306; G06T 2207/30164; G06T 7/0046
   USPC ........................................... 700/259
   See application file for complete search history.

(56) References Cited

U.S. PATENT DOCUMENTS

| | | | |
|---|---|---|---|
| 6,328,523 B1* | 12/2001 | Watanabe et al. | 414/416.01 |
| 7,177,459 B1* | 2/2007 | Watanabe et al. | 382/151 |
| 2002/0009231 A1* | 1/2002 | Yamamoto et al. | 382/217 |
| 2004/0086364 A1* | 5/2004 | Watanabe et al. | 414/416.01 |
| 2004/0186624 A1* | 9/2004 | Oda et al. | 700/245 |
| 2004/0190766 A1* | 9/2004 | Watanabe et al. | 382/154 |
| 2006/0049340 A1 | 3/2006 | Haberer et al. | |
| 2006/0104788 A1* | 5/2006 | Ban et al. | 414/729 |
| 2007/0133862 A1* | 6/2007 | Gold et al. | 382/149 |

(Continued)

FOREIGN PATENT DOCUMENTS

| KR | 10-1999-0066116 A | 8/1999 |
|---|---|---|
| KR | 10-2010-0098997 A | 9/2010 |

*Primary Examiner* — Harry Oh

(57) ABSTRACT

Disclosed is a working method using a sensor, which increases recognition of a component to increase mounting of a component and enhancing productivity. The working method includes: extracting an object to be picked from a pile of objects using the sensor; picking the extracted object to move the picked object to a predetermined place; and estimating an angle of the moved object in the current position using the sensor. Accordingly, the working method can perform precise component recognition and posture estimation by two steps: a component picking step and a component recognition step, and effectively apply to a manufacturing line, thereby improving mounting of a component and enhancing productivity of a product.

6 Claims, 3 Drawing Sheets

(56) References Cited

U.S. PATENT DOCUMENTS

| | | | |
|---|---|---|---|
| 2009/0304299 A1* | 12/2009 | Motomura et al. | 382/254 |
| 2010/0004778 A1* | 1/2010 | Arimatsu et al. | 700/214 |
| 2010/0177095 A1* | 7/2010 | Watkins et al. | 345/426 |
| 2010/0260378 A1* | 10/2010 | Noy et al. | 382/103 |
| 2011/0157178 A1* | 6/2011 | Tuzel et al. | 345/426 |
| 2012/0155762 A1* | 6/2012 | Tsukada et al. | 382/167 |
| 2012/0207340 A1* | 8/2012 | Bulan et al. | |
| 2012/0262455 A1* | 10/2012 | Watanabe et al. | 345/420 |
| 2013/0163858 A1* | 6/2013 | Kim et al. | 382/156 |

\* cited by examiner

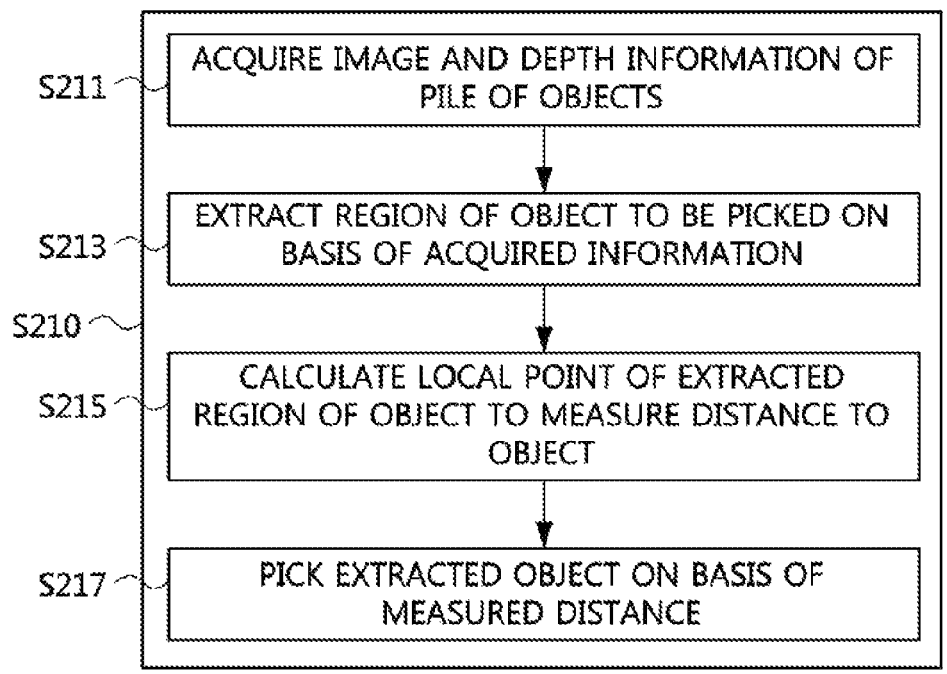
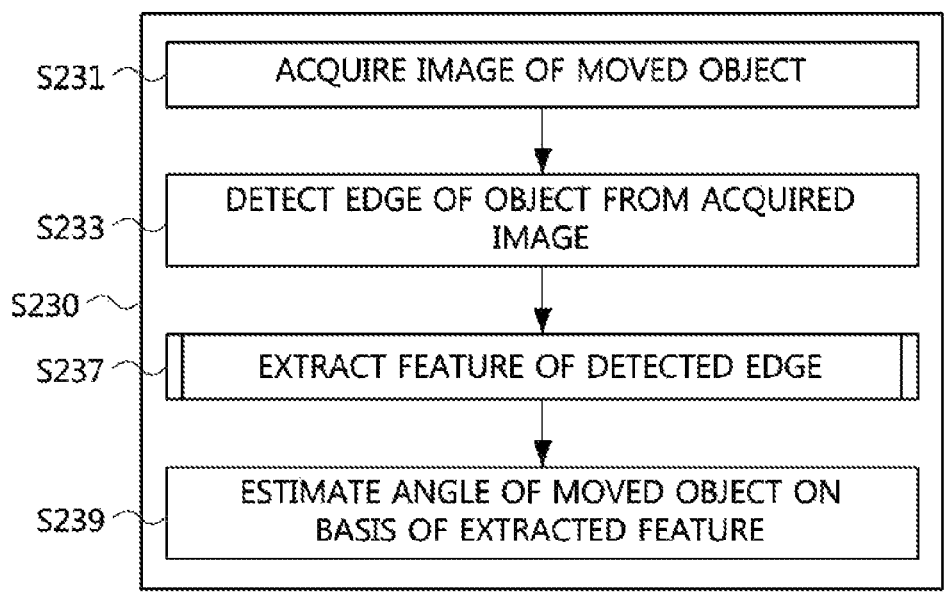

WORKING METHOD USING SENSOR AND WORKING SYSTEM FOR PERFORMING SAME

CLAIM FOR PRIORITY

This application claims priority to Korean Patent Application No. 10-2012-0109982 filed on Oct. 4, 2012 in the Korean Intellectual Property Office (KIPO), the entire contents of which are hereby incorporated by reference.

BACKGROUND

1. Technical Field

Example embodiments of the present invention relate to an automatic working method using a sensor, and more specifically, to a working method using a sensor, which can improve mounting of an object and enhance productivity of a product, and a working system for performing the same.

2. Related Art

Industrial robots were appeared since 2000 and have been used as an effective means for solving challenges in industrial sites, such as automation tasks, production cost saving, delivery shortage, workforce reduction, etc., and enhancing competitiveness of production systems.

Industrial robots have been started to be introduced in a working environment in which it is difficult for a person to perform works, applied to a vehicle spot welding process, a painting process, and so on and thus used in an automobile industry, a general industry, and a variety of domestic and foreign applications.

Specifically, as performance in a vision sensor technology is developed, among robots being introduced in a manufacturing line, a workpiece automatic installation robot for supplying a machine tool with workpieces disposed around the robot by putting the workpieces one by one in cooperation with a vision sensor has been developed.

Also, even in a machine object assembly process which had a low rate of automation, industrial robots are introduced to perform works at a manufacturing line instead of skilled workers using various IT technologies and elements technologies such as a variety of sensors (for example, a vision sensor, a force sensor, etc.), a control technology, a machine technology, etc.

Also, as a sensing technology among element technologies applied to an industrial robot is enhanced and thus performance in a three-Dimensional visual sensor is also significantly improved, a need to develop an intelligent robot capable of performing a bin-picking work in which a needed object is recognized and picked from a stacked pile is being increased.

However, a visual recognition method or technology applicable to the bin-picking work is not yet applied to the manufacturing line because the visual recognition method or technology is not yet developed sufficiently and has low recognition.

Also, an existing bin-picking method includes a method of extracting polygonal and circular regions of an object from a stereo image, a method using a camera image and a CAD model, and a method for modeling a 2-D curved surface with both laser measurement and video images to recognize a position and direction of a 3-D object.

However, it is actually difficult to estimate accurate angles of components disposed at a variety of angles in piles and illuminations changed according to an actual production environment.

SUMMARY

Accordingly, example embodiments of the present invention are provided to substantially obviate one or more problems due to limitations and disadvantages of the related art.

Example embodiments of the present invention provide a working method using a sensor for improving recognition of an object and enhancing productivity of a product.

Example embodiments of the present invention also provide a working system for performing the working method using the sensor.

In some example embodiments, an automatic working method using a sensor includes: extracting an object from a pile of objects using a sensor; picking the extracted object to move the object to a predetermined place; and estimating an angle of the moved object in the current position using the sensor.

The extracting of the object may include: acquiring an image and depth information of the pile of objects using a visual sensor; extracting a region of the object using the acquired image and depth information of the pile of objects; calculating a local point of the extracted region of the object to measure a distance to the extracted object using a distance sensor; and picking the extracted object on the basis of the measured distance to move the object to a predetermined place.

The extracted region of the object may correspond to a region of a standard model having an angle that is the same as an angle of the extracted region of the object in x-axis, y-axis, and z-axis directions using the acquired image and depth information of the object.

The estimating of an angle of the moved object using the sensor may include: acquiring an image of the moved object in the current position using the sensor; detecting an edge of the object from the acquired image; extracting a feature of the detected edge; and comparing the extracted feature of the edge with a predetermined object standard model to estimate the angle of the moved object in the current position.

The detecting of an edge of the object from the acquired image may include detecting an edge of the object by performing an image smoothing process on the acquired image and applying adaptive binarization and second derivative to a local region.

The extracting of a feature of the detected edge may include: normalizing the detected edge; and extracting statistical and structural features on the basis of at least one of a pixel distribution of a region of the object, a distance between the distributed pixels of the object, and the number of cross points with respect to the detected local region of the edge.

In other example embodiments, an automatic working system using a sensor comprising: a pile image acquisition unit configured to acquire and provide an image and depth information of a pile of objects using a visual sensor; a processing unit configured to extract a region of at least one object using the acquired and provided image and depth information of the objects, calculate a local point of the extracted region of at least one object, measure a distance to the at least one object using the sensor, and provide the measured distance; a picking unit configured to pick the at least one object on the basis of the measured distance, which is provided, to move the at least one object to a predetermined place; an object image acquisition unit configured to acquire an image of the moved object; and an object recognition unit configured to detect an edge of the object from the acquired image of the object, extract a feature of the detected edge, compare the extracted feature with a predetermined object standard model, and estimate an angle of the object after it has been picked in the current position.

The pile image acquisition unit may extract a region of the object corresponding to a region of a standard model having an angle that is the same as an angle of the extracted region of the object in x-axis, y-axis, and z-axis directions using the acquired and provided image and depth information of the object.

The object recognition unit may detect an edge of the object by performing an image smoothing process on the image of the moved object and applying adaptive binarization and second derivative for a local region.

The object recognition unit may normalize the detected edge and extract statistical and structural features on the basis of at least one of a pixel distribution of a region of the object, a distance between the distributed pixels of the object, and the number of cross points with respect to the detected local region of the edge.

BRIEF DESCRIPTION OF DRAWINGS

Example embodiments of the present invention will become more apparent by describing in detail example embodiments of the present invention with reference to the accompanying drawings, in which:

FIG. 3 is a flowchart illustrating a process of extracting an object picked according to an embodiment of the present invention;

FIG. 4 is a flowchart illustrating a process of estimating posture of an object moved according to an embodiment of the present invention;

DESCRIPTION OF EXAMPLE EMBODIMENTS

Figure 1:
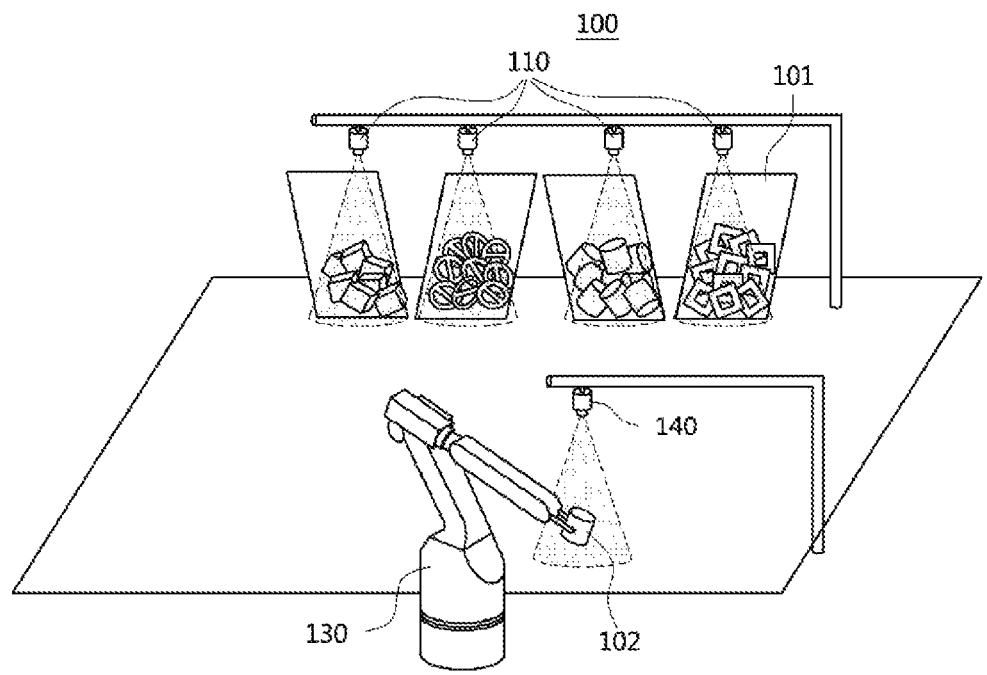
FIG. 1 is a conceptual view illustrating an operating environment of an automatic working system using a sensor according to an embodiment of the present invention.

Since the present invention may have diverse modified embodiments, preferred embodiments are illustrated in the drawings and are described in the detailed description of the invention.

However, it should be understood that the particular embodiments are not intended to limit the present disclosure to specific forms, but rather the present disclosure is meant to cover all modification, similarities, and alternatives which are included in the spirit and scope of the present disclosure.

Relational terms such as first, second, and the like may be used for describing various elements, but the elements should not be limited by the terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the following description, the technical terms are used only for explaining a specific exemplary embodiment while not limiting the present disclosure. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Embodiments of the present invention will be described below in more detail with reference to the accompanying drawings. In describing the invention, to facilitate the entire understanding of the invention, like numbers refer to like elements throughout the description of the figures, and a repetitive description on the same element is not provided.

FIG. 1 is a conceptual view illustrating an operating environment of an automatic working system using a sensor according to an embodiment of the present invention.

Referring to FIG. 1, an automatic working system 100 having a sensor according to an embodiment of the present invention includes a pile image acquisition unit 110 (for example, a visual sensor and a position sensor) for recognizing a position of an object piled in a bin 101 and a picking unit 130 for picking the object whose position is recognized.

Here, the working system using a sensor may acquire an image of a pile of components within the bin 101 using the pile image acquisition unit 110 (for example, a visual sensor).

Then, the automatic working system 100 moves an object 102 picked by a picking unit 130 to a predetermined place (for example, an angle estimation worktable), acquires an image of the moved object using the object image acquisition unit 140 (for example, a visual sensor), and then estimates an angle of the object on the basis of the acquired image.

The automatic working system 100 using a sensor according to an embodiment of the present invention can perform precise object recognition and angle estimation through an object picking step and an object recognition step and effectively apply to a manufacturing line, thereby improving mounting of an object and enhancing productivity.

Figure 2:
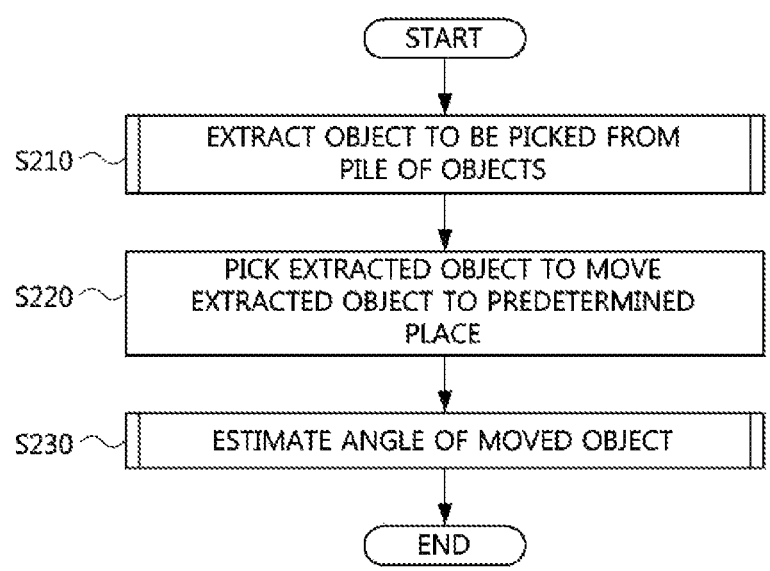
FIG. 2 is a flowchart illustrating a process of an automatic working method using a sensor according to an embodiment of the present invention.

FIG. 2 is a flowchart illustrating a process of an automatic working method using a sensor according to an embodiment of the present invention.

Referring to FIG. 2, an automatic working system using a sensor (hereinafter, shortly referred to as an automatic working system) extracts an object to be picked from a pile of components, using a visual sensor (for example, a 3-D visual sensor) and a position sensor (S210).

The automatic working system picks the object extracted through step S210 to move the picked object to a predetermined place (S220).

Then, the automatic working system estimates an angle of the object moved through step S220 (S230).

The extracting of an object to be picked (S210) and the estimating of an angle of the moved object (S220) will be described below in details with reference to FIGS. 3 to 5.

FIG. 3 is a flowchart illustrating a process of extracting an object to be picked according to an embodiment of the present invention.

Referring to FIG. 3, the automatic working system acquires an image and depth information of a pile of components, using the visual sensor (S211).

Here, the automatic working system may acquire images of components using a visual sensor (for example, 3-D visual sensor) in an automatic worktable having a visual sensor and a lighting device to establish a database. That is, the database may be established by acquiring images and depth information about a variety of components piled at random while frequently changing angles of the components.

Then, the automatic working system extracts a region of at least one object to be picked, using the images and depth information acquired through step S211 (S213).

Here, the automatic working system extracts a region of the object corresponding to a region of a standard model that has an angle that is the same as an angle of the extracted region of the object in x-axis, y-axis, and z-axis directions, using the acquired object images. The object may correspond to a picking object.

Then, the automatic working system calculates a local point of the region of the object extracted through step S213 and then measures an accurate distance to the object using a distance sensor (S215).

Here, the automatic working system may reduce an error as far as possible by performing step S215, thereby facilitating picking of an object.

The automatic working system picks the object out of the pile of components on the basis of the measured distance (S217).

Here, so as to easily perform the picking of the object in consideration of an error rate for the distance information or position of the component, the automatic working system may find a center point of the object and pick the object using a picking device (for example, a suction device, etc.)

FIG. 4 is a flowchart illustrating a process of estimating an angle of the moved object according to an embodiment of the present invention.

In the automatic working method according to an embodiment of the present invention, it is assumed that a database is established by classifying and learning components on the basis of their types and angles. The establishment of the database may be performed using the following procedure.

The automatic working system may acquire an image of an object through a visual sensor to establish an object image database. That is, the automatic working system may acquire information about an angle at which the object may be disposed and then acquire the image of the object to establish the object image database while changing a rotation angle along z-axis.

Here, the automatic working system may apply different illumination conditions on an hour-by-hour basis to acquire the image of the object under a variety of illumination environment to establish the database.

Also, the automatic working system performs an image smoothing process for reduction of illumination influence using the established object image database. Subsequently, the automatic working system extracts each edge of an object applying adaptive binarization and second derivative for a local region to detect an edge of the combined component, so as to extract edge elements of the object from the object image distorted due to shadow and illumination influence.

Next, the automatic working system detects and normalizes an edge surrounding an object region, and extracts statistical and structural features such as pixel distribution of a region of an object for the local region, a distance between the distributed pixels of the object in a vertical direction and a horizontal direction, and the number of cross points.

Here, the automatic working system removes a noise pixel existing in a region other than a region of interest (ROI) in which an object exists.

Subsequently, the automatic working system learns the object image obtained as a result of binarization and second derivative.

Here, the automatic working system may sub-classify components using a z-direction variable value divided by "a" degrees and then learn the components on the basis of their postures and angles.

Referring to FIG. 4, the automatic working system acquires an image of a moved component, using a visual sensor (S231).

Subsequently, the automatic working system detects an edge of the object from the image acquired through step S231 (S233).

Specifically, the automatic working system performs an image smoothing process for reduction of illumination and shadow influence in the image acquired through step S231 and detects an edge of the object applying adaptive binarization and second derivative for a local region in order to conserve object features vulnerable to distortion due to an ambient environment and extract an object region using the established object image database.

The automatic working system extracts features of the edge detected through step S233 (S237).

Then, the automatic working system recognizes an object on the basis of an object image data base previously established with respect to the features extracted through step S237 and estimates a difference angle in comparison with an object standard model selected on the basis of an angle and a posture (S239).

Figure 5:
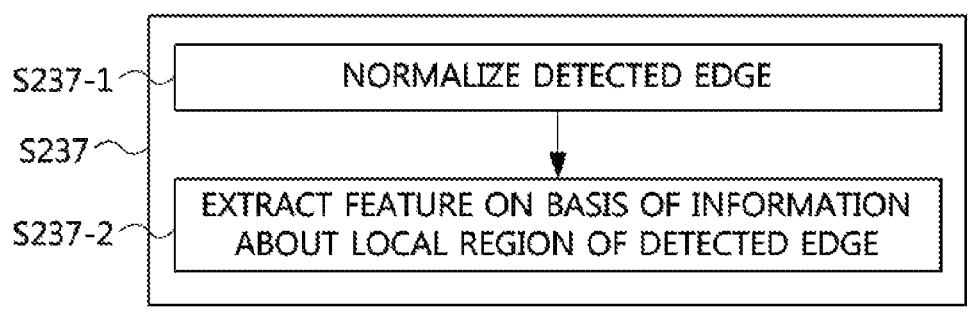
FIG. 5 is a flowchart illustrating a process of extracting a feature of an edge detected during the process of estimating posture of a moved object of FIG. 4.

FIG. 5 is a flowchart illustrating a process of extracting a feature of an edge detected during the process of estimating an angle of a moved object of FIG. 4.

Referring to FIG. 5, the automatic working system normalizes the detected edge (S237-1).

Next, the automatic working system extracts statistical and structural features such as pixel distribution of a region of an object for a local region of the detected edge, a distance between the distributed pixels of the object in vertical and horizontal directions, and the number of cross points (S237-2).

Here, the automatic working system may remove a noise pixel existing in a region other than a region of interest (ROI) in which an object exists.

Figure 6:
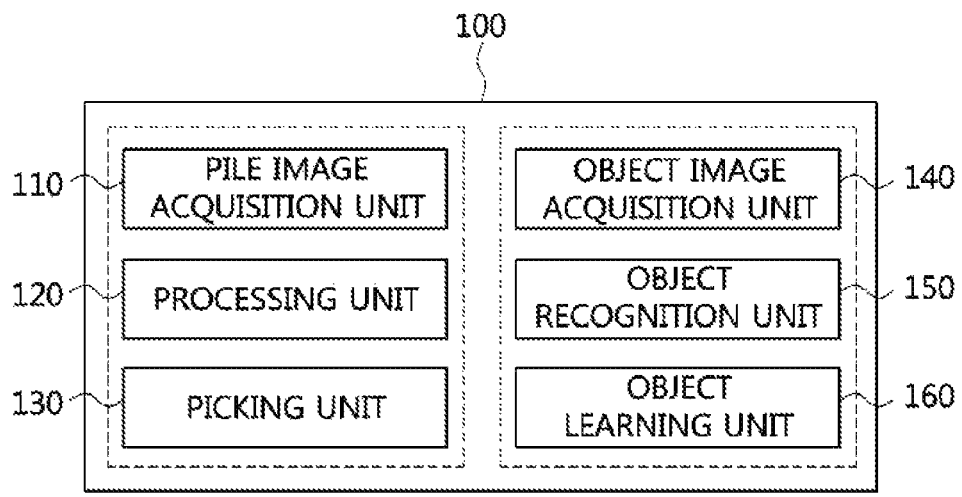
FIG. 6 is a block diagram illustrating a configuration of an automatic working system using a sensor according to an embodiment of the present invention.

FIG. 6 is a block diagram illustrating a configuration of an automatic working system using a sensor according to an embodiment of the present invention.

Referring to FIG. 6, the automatic working system using a sensor according to an embodiment of the present invention may include a pile image acquisition unit 110, a processing unit 120, a picking unit 130, an object image acquisition unit 140, an object recognition unit 150, and an object learning unit 160.

First, the pile image acquisition unit 110 acquires an image of a pile of components and provides the acquired image to the processing unit 120.

Here, the pile image acquisition unit 110 may include a visual sensor, a position sensor, a distance sensor, etc.

The processing unit 120 extracts a region of at least of one object to be picked, using depth information of the object and the image of the object provided from the pile image acquisition unit 110.

Here, the processing unit 120 sets a standard model, and extracts a region of the object that corresponds to a region of the standard model, which has an angle that is the same as an angle of the extracted region of the object in x-axis, y-axis, and z-axis directions using the acquired object image. The object may be a picking object.

Here, the processing unit 120 extracts a region of an object most similar to the standard model such that object picking may be facilitated.

Also, the processing unit 120 calculates a local point of the extracted region of the object and accurately measures the distance to the object using a distance sensor.

Here, the processing unit 120 calculates a local point of the extracted region of the object and accurately measures the distance, thereby reducing an error in object picking.

The picking unit 130 picks the object out of the pile of components on the basis of the distance measured by the processing unit 120 and move the picked object to a predetermined place.

Here, the picking unit 130 may find a central point of the object to pick the object with a suction device so as to facilitate the object picking in consideration of an error rate for the distance information or a position of the component.

The object image acquisition unit 140 acquires an image of the object moved to the predetermined place by the picking unit 130 using a visual sensor, and provides the acquired image of the object to the object recognition unit 150.

The object recognition unit 150 detects an edge of the object from the image of the object provided by the object image acquisition unit 140.

Specifically, the object recognition unit 150 performs an image smoothing process for reduction of illumination and shadow influence in the image acquired through the object image acquisition unit 140 and detects an edge of the object applying adaptive binarization and second derivative for a local area in order to conserve object features vulnerable to distortion due to an ambient environment and extract an object region.

Also, the object recognition unit 150 normalizes the detected edge and extracts statistical and structural features such as pixel distribution of a region of an object for a local area of the detected edge, a distance between the distributed pixels of the object in vertical and horizontal directions, and the number of cross points.

Here, the object recognition unit 150 may remove a noise pixel existing in a region other than a region of interest (ROI) in which an object exists.

Also, the object recognition unit 150 receives the previously established object image database from an object learning unit 160 with respect to the extracted features, recognizes the object on the basis of the received object image database, and estimates a difference angle in comparison with an object standard model in which the recognized object is classified on the basis of its angle.

The object learning unit 160 may acquire the image of the object from the object image acquisition unit 140 to establish the object image database. That is, the object learning unit 160 may acquire information about an angle at which the object may be disposed and then acquire the image of the object to establish the object image database while changing a rotation angle along z-axis.

Here, the object learning unit 160 applies different illumination conditions on an hour-by-hour basis to acquire the image of the object under a variety of illumination environment to establish a database, and performs an image smoothing process for reduction of illumination influence using the established object image database.

Also, after the image smoothing process, the object learning unit 160 extracts each edge of the object applying adaptive binarization and second derivative for a local area to detect the edge of the combined object part, so as to extract edge elements of the object from the object image distorted due to shadow and illumination influence.

Also, the object learning unit 160 detects and normalizes an edge surrounding the object region, and then extracts statistical and structural features such as pixel distribution of a region of an object in the local area, a distance between the distributed pixels of the object in a vertical direction and a horizontal direction, and the number of cross points.

Here, the object learning unit 160 removes a noise pixel existing in a region other than a region of interest (ROI) in which the object exists.

Also, the object learning unit 160 performs a learning process on the object image obtained as a result of binarization and second derivative. Here, in the learning process, components are sub-classified using a z-direction variable value divided by "a" degrees and then learned on the basis of their postures and angles.

The automatic working system 100 using a sensor according to an embodiment of the present invention can perform precise object recognition and angle estimation through an object picking step and an object recognition step and effectively apply to a manufacturing line, thereby improving mounting of an object and enhancing productivity.

The working method having a sensor and the working system for performing the same according to an embodiment of the present invention include extracting approximate position and distance information about an object to be picked, picking the component, moving the picked object to a worktable, recognizing an angle of the component, and then performing assembly and packing.

Accordingly, the working method using a sensor and the working system for performing the same according to an embodiment of the present invention can perform precise object recognition and posture estimation by two steps: an object picking step and an object recognition step, and effectively apply to a manufacturing line, thereby improving mounting of an object and enhancing productivity.

While the example embodiments of the present invention and their advantages have been described in detail, it should be understood that various changes, substitutions and alterations may be made herein without departing from the scope of the invention.

What is claimed is:

1. A working method using a sensor, comprising:
acquiring image and depth information of a pile of objects using a visual sensor, the pile of objects including an object;
extracting a region of an object in the pile of objects that corresponds to a region of a standard model having an angle that is the same as an angle of the extracted region of the object in x-axis, y-axis, and z-axis directions using the image and depth information of the pile of objects;

calculating a local point of the extracted region of the object and measuring a distance to the local point using a distance sensor;

picking the object on the basis of the measured distance;

moving the object to a predetermined place;

acquiring an image of the object after the object has been moved;

detecting an edge of the object from the image of the object;

extracting a feature of the detected edge; and estimating an angle of the object after the object has been moved by comparing the extracted feature of the detected edge with an edge of a predetermined object standard model included in an object image database, wherein the object image database includes stored images of the object acquired under a variety of illumination environments and at a plurality of rotation angles, and wherein estimating the angle of the object includes reducing an illumination influence on the image of the object using the predetermined object standard model of the object image database.

2. The working method of claim 1, wherein detecting the edge of the object from the acquired image comprises performing an image smoothing process on the acquired image and applying adaptive binarization and a second derivative for a local region.

3. The working method of claim 1, wherein extracting the feature of the detected edge comprises:

normalizing the detected edge; and extracting statistical and structural features on the basis of one of a pixel distribution of a region of the image of the object, a distance between the distributed pixels of the image of the object, and the number of cross points with respect to the detected local region of the edge.

4. An automatic working system using a sensor comprising:

a pile image acquisition unit configured to acquire and provide image and depth information of an object among a pile of objects using a visual sensor;

a processing unit configured to extract a region of the object that corresponds to a region of a standard model using the image and depth information of the object, to calculate a local point of the extracted region of the object, and to measure a distance to the local point, wherein the region of the standard model has an angle that is the same as an angle of the extracted region of the object in x-axis, y-axis, and z-axis directions;

a picking unit configured to pick the object on the basis of the measured distance and move the object to a predetermined place;

an object image acquisition unit configured to acquire an image of the object after the object has been moved;

an object recognition unit configured to detect an edge of the object from the image of the object, to extract a feature of the detected edge, to compare the extracted feature of the detected edge with an edge of a predetermined object standard model included in an object image database, and to estimate an angle of the object based on the predetermined object standard model in the object image database; and an object learning unit configured to establish the object image database by storing a plurality of images of the object under a variety of illumination conditions and at a plurality of rotation angles, wherein the object recognition unit is further configured to reduce an illumination influence on the extracted feature of the detected edge using the predetermined object standard model of the object image database.

5. The working system of claim 4, wherein the object image acquisition unit is configured to detect an edge of the object by performing an image smoothing process on the image of the object and applying adaptive binarization and a second derivative for a local region.

6. The working system of claim 4, wherein the object recognition unit is configured to normalize the detected edge and extract statistical and structural features on the basis of at least one of a pixel distribution of a region of the image of the object, a distance between the distributed pixels of the image of the object, and a number of cross points with respect to a detected local region of the edge.

* * * * *